(12) United States Patent
Berne et al.

(10) Patent No.: US 10,953,801 B2
(45) Date of Patent: Mar. 23, 2021

(54) MIRROR ASSEMBLY

(71) Applicant: Volvo Truck Corporation, Gothenburg (SE)

(72) Inventors: Nicolas Berne, Heyrieux (FR); Eddy Curtil, Chaponnay (FR); Won Chol Yeom, La Mulatiere (FR); Pierre-Alexandre Martin, Lyons (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 16/498,851

(22) PCT Filed: Mar. 30, 2017

(86) PCT No.: PCT/IB2017/000540
§ 371 (c)(1),
(2) Date: Sep. 27, 2019

(87) PCT Pub. No.: WO2018/178734
PCT Pub. Date: Oct. 4, 2018

(65) Prior Publication Data
US 2020/0269761 A1   Aug. 27, 2020

(51) Int. Cl.
*B60R 1/06* (2006.01)
*B60R 1/08* (2006.01)

(52) U.S. Cl.
CPC ............ *B60R 1/0612* (2013.01); *B60R 1/081* (2013.01)

(58) Field of Classification Search
CPC ..... B60R 1/0605; B60R 1/0612; B60R 1/072; B60R 1/081

USPC .................................................. 359/865, 877
See application file for complete search history.

(56) References Cited

U.S. PATENT DOCUMENTS

| | | | | |
|---|---|---|---|---|
| 3,612,647 A | * | 10/1971 | Laprairie | B60R 1/0602 359/507 |
| 3,667,369 A | * | 6/1972 | Smith | B60J 1/14 454/135 |
| 3,712,715 A | * | 1/1973 | Wagner | F16C 11/0661 359/855 |
| 4,134,612 A | * | 1/1979 | Nelson | B60R 1/0602 15/313 |

(Continued)

FOREIGN PATENT DOCUMENTS

| | | |
|---|---|---|
| DE | 1959501 A1 | 6/1971 |
| DE | 4408611 A1 | 7/1994 |

(Continued)

OTHER PUBLICATIONS

International Search Report and Written Opinion for International Patent Application No. PCT/IB2017/000540, dated Dec. 6, 2017, 8 pages.

*Primary Examiner* — Ricky D Shafer
(74) *Attorney, Agent, or Firm* — Withrow & Terranova PLLC

(57) ABSTRACT

The invention relates to a side view mirror assembly (10) comprising a first mirror (12) and a second mirror (12), a lower arm (24, 240) and an upper arm (18, 180) for mounting said assembly to a vehicle, wherein said lower and upper arms (24, 240, 18, 180) are linked by a structural element (30), wherein first and second mirrors (12, 14) are coupled to respective lower and upper arms (24, 240, 18, 180) and in that said structural element (30) integrates the first and second mirrors (12, 14) and is transparent.

14 Claims, 3 Drawing Sheets

(56) References Cited

U.S. PATENT DOCUMENTS

| | | | | |
|---|---|---|---|---|
| 4,208,104 | A | * | 6/1980 | Peterson ................ B60R 1/081 |
| | | | | 248/487 |
| 4,248,497 | A | * | 2/1981 | Leighton .............. B60R 1/0602 |
| | | | | 15/250.003 |
| 4,325,609 | A | | 4/1982 | Alford |
| 4,577,929 | A | * | 3/1986 | Guillen .................... B60R 1/06 |
| | | | | 296/91 |
| 4,804,257 | A | * | 2/1989 | Schmidt ............... B60R 1/0605 |
| | | | | 248/479 |
| 4,844,529 | A | | 7/1989 | O'Saben |
| 4,890,909 | A | | 1/1990 | Schmidt et al. |
| 4,940,320 | A | * | 7/1990 | Tribble .................. B60R 1/081 |
| | | | | 248/480 |
| 5,042,865 | A | | 8/1991 | O'Saben |
| 6,247,821 | B1 | * | 6/2001 | Brewster .................. B60R 1/10 |
| | | | | 359/841 |
| 2013/0050859 | A1 | * | 2/2013 | Shin ......................... B60R 1/10 |
| | | | | 359/850 |
| 2020/0070728 | A1 | * | 3/2020 | Ballarin ............... B60R 1/0605 |

FOREIGN PATENT DOCUMENTS

| | | | |
|---|---|---|---|
| EP | 2363148 A1 | | 11/2011 |
| WO | WO2019135097 | * | 9/2019 |

\* cited by examiner

MIRROR ASSEMBLY

This application is a 35 USC 371 national phase filing of International Application No. PCT/IB2017/000540, filed Mar. 30, 2017, the disclosure of which is incorporated herein by reference in its entirety.

TECHNICAL FIELD

This invention relates generally to a mirror assembly and, more particularly but not necessarily exclusively, to a side view mirror assembly for commercial vehicles.

The invention can be applied in heavy-duty vehicles, such as trucks, buses and construction vehicles and, although the invention will be described with respect to a commercial transport vehicle, it is not restricted to this particular vehicle, but may also be used in other vehicles such as buses, refuse trucks, mixer trucks and, indeed, any other vehicles utilising at least first and second side view mirrors on at least one side thereof.

BACKGROUND

A side view mirror is found on the exterior of most motor vehicles for the purposes of assisting the driver to see areas behind and to the sides of the vehicle, outside of the driver's peripheral vision (in the 'blind spot'). Typically, although not necessarily exclusively, a side view mirror is mounted on each side of the front doors of a vehicle, normally at the A-pillar thereof.

For many years, legislation in several countries has required vehicles over a certain size/weight to be fitted with a main side view mirror and also with a wide angle mirror to improve the driver's visibility of pedestrians or cyclists, especially when the vehicle is making a left turn (right hand drive vehicles) or a right turn (left hand drive vehicles). For example, in 2009, a new EU Directive came into force stipulating that all vehicles over 3.5 tons need to be fitted with a wide angle mirror (Class IV) as well as the main mirror (Class II).

Side view mirror assemblies incorporating a Class II and Class IV mirror have been proposed. One such assembly comprises a first and second mirror, each mounted within respective first and second opaque rear housings. The housings are connected together by means of one or more connecting member, such that the mirrors are vertically aligned and, in some cases, spaced apart from each other with a small gap therebetween. Each mirror may be independently pivotally adjustable about a generally central vertical axis to allow the driver to adjust their field of view as required. Upper and lower arms are provided, typically on the larger of the two housings, for affixing the assembly to the vehicle.

There is an ongoing desire to further improve and enhance driver visibility, whereas a side view mirror assembly of the type described above can obstruct the user's forward (direct) field of view which, in some circumstances may be detrimental. Whilst a driver can, in some cases, see through the space between the first and second mirrors in prior art assemblies, their view will inevitably be obstructed by the connecting member between the two housings, as well as the periphery of the housings themselves.

U.S. Pat. No. 4,325,609 discloses a side view mirror arrangement for a heavy duty vehicle comprising a transparent backing means attached to the frame for holding the plane mirror and convex mirror such that the forward view through the mirrors is also through the backing means. Thus, the backing means is transparent and permits viewing through both mirrors in a forward direction. However, such an assembly would not comply with current regulations, which require at least 70% reflection of vehicle mirrors. Furthermore, in the described assembly, the mirrors are provided on the same support, such that there is no possibility of independently adjusting the relative positions thereof.

SUMMARY

An object of the present invention is to address at least some of the issues described above, and provide a side view mirror assembly for heavy-duty vehicles that provides reduced driver direct view obstruction.

The above-mentioned object is achieved, in accordance with an aspect of the present invention, by a side view mirror assembly comprising a first mirror and a second mirror, a lower arm and an upper arm for mounting said assembly to a vehicle, wherein said lower and upper arms are linked by a structural element, characterized in that said first and second mirrors are directly coupled to respective lower and upper arms, and in that said structural element integrates the first and second mirrors and is transparent.

By the provision of a side view mirror assembly having a transparent structural element that performs the function of integrating the first and second mirrors, driver direct view visibility is greatly improved as any obstruction between and/or around the mirrors is eliminated, whilst providing a mirror assembly having good structural integrity, sufficient to withstand vibrations to which it is subjected during normal use.

According to a further embodiment, the structural element may comprise adjustment means configured to enable a vertical spacing between the first and second mirrors to be selectively altered between a first position, in which the mirrors are vertically immediately adjacent or abutting each other, and a second position, in which the first and second mirrors are vertically spaced from each other. A further advantage can thus be achieved because the first position provides better aerodynamics, required when the vehicle is travelling at higher speeds, and the second position provides better driver visibility, required when negotiating traffic at relatively lower speeds.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figures 1, 1A:
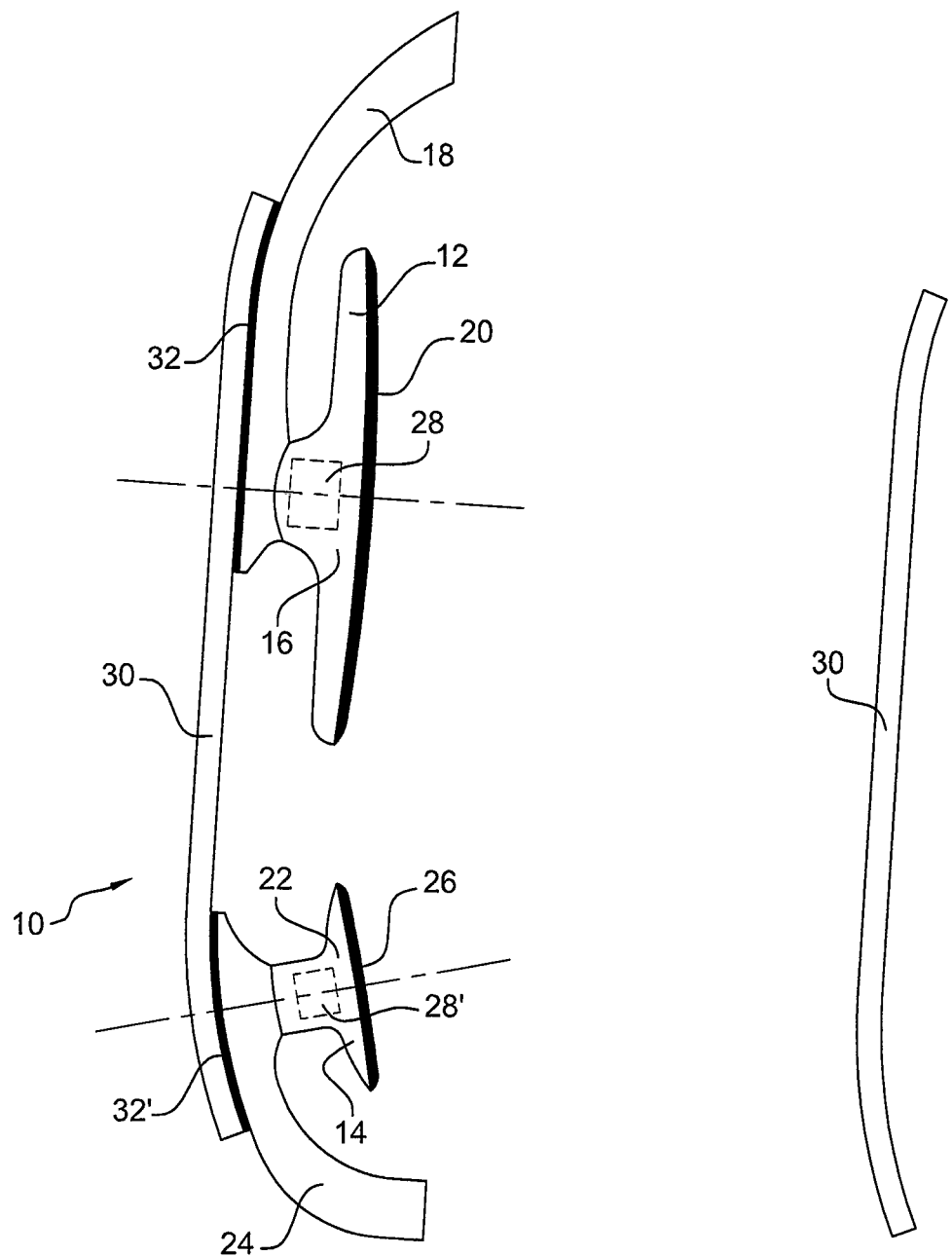
FIG. 1 is a schematic side view of a side view mirror assembly according to a first exemplary embodiment of the present invention.
FIG. 1A is a schematic plan view of the transparent panel of the side view mirror assembly of FIG. 1.

Referring to FIG. 1 of the drawings, a side view mirror assembly 10 according to a first exemplary embodiment of the present invention comprises a first (Class II) mirror 12 and a second (Class IV) mirror 14. Conventionally, the two mirrors are vertically aligned with the Class II mirror above the Class IV mirror when the assembly is oriented for use, but the present invention is not necessarily intended to be limited in this regard. The first mirror 14 comprises a mounting member 16 coupled to an upper arm 18 such that the reflective surface 20 thereof faces the rear of the assembly (when oriented for use). The 10 second mirror 14 comprises a mounting member 22 coupled to a lower arm 24 such that the reflective surface 26 thereof faces the rear of the assembly (when oriented for use).

Each of the mounting members 16, 22 is coupled to a respective arm 18, 24 via an actuator 28, 28', the actuator being configured to enable selective adjustment of the respective mirror about a horizontal and/or vertical axis, to enable the driver to adjust their mirrors to their own precise preference.

Each of the arms 18, 24 is mounted, on the surface opposite that on which the respective mirror is mounted, on a structural element 30 formed of a transparent panel. The transparent panel may be formed of, for example, glass (such as that conventionally used for vehicle windscreens) or plastic (such as that conventionally used for vehicle headlights), although the present invention is not necessarily intended to be limited in this regard. Referring to FIG. 1A of the drawings, the panel 30 may have a horizontal cross-section in consideration of the aerodynamic characteristics of the assembly, but this is not necessarily essential. The arms 18, 24 may be mounted on the panel 30 by means of a respective layer of glue 32, 32'.

Figure 3:
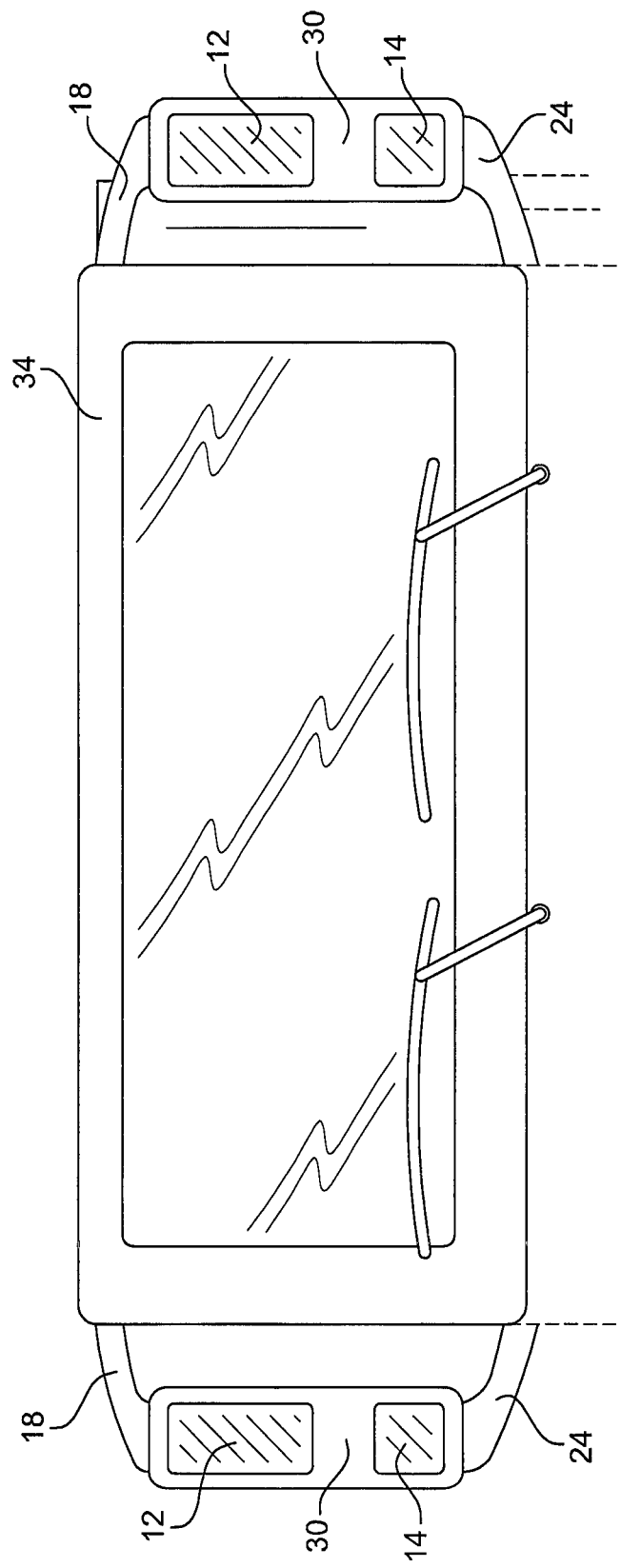
FIG. 3 is a schematic front partial view of a vehicle cab equipped with a side view mirror 35 assembly according to an exemplary embodiment on each side thereof.

Referring additionally to FIG. 3 of the drawings, in use, the mirror assembly 10 can be mounted to the cab of a vehicle, 34, typically at the A-pillar thereof, via the arms 18, 24 in a conventional manner, such that the transparent panel 30 forms the front housing of the assembly and the reflective surfaces 20, 26 of the mirrors face the rear of the vehicle. The structure of the proposed design provides adequate structural integrity, which improving driver visibility between and around the mirrors: there is no obstruction in the vertical space between the mirrors, nor is there any peripheral obstruction around the mirrors. The arms 18, 24 are opaque, which is particularly desirable, principally for aesthetic reasons: there may be wires running through the arms (for the mirror heating system, for example) which are most preferably hidden by the opaque arms.

Figure 2A:
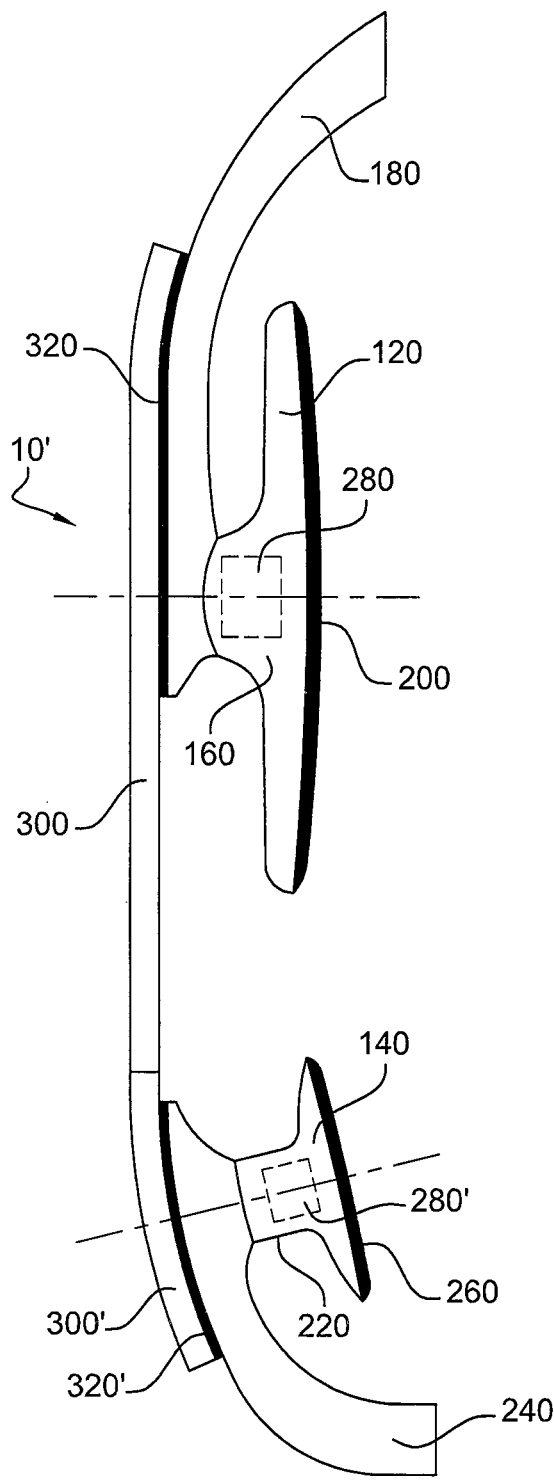
FIG. 2A is a schematic side view of a side view mirror assembly according to a second exemplary embodiment of the invention, illustrating the mirrors in a first relative position.
Figure 2B:
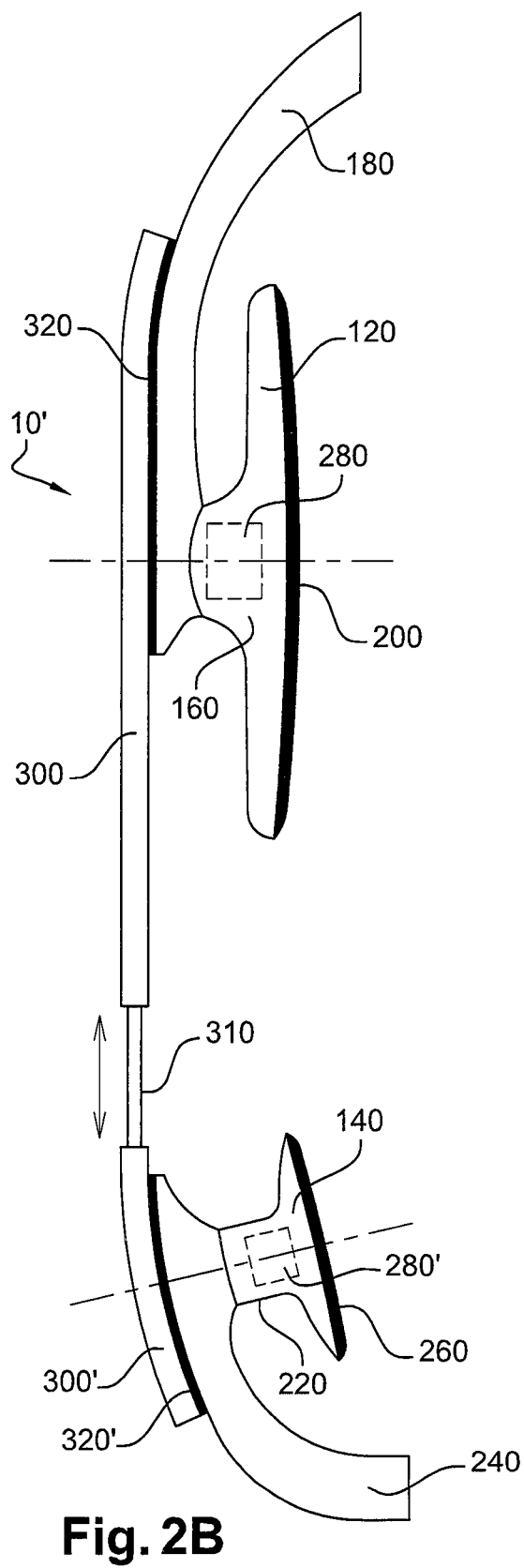
FIG. 2B is a schematic side view of the side view mirror assembly of FIG. 2A, illustrating the mirrors in a second relative position.

Referring now to FIGS. 2A and 2B of the drawings, a side view mirror assembly 10' according to a second exemplary embodiment of the present invention, once again comprises a first (Class II) mirror 120 and a second (Class IV) mirror 140. Conventionally, the two mirrors are vertically aligned with the Class II mirror above the Class IV mirror when the assembly is oriented for use, but the present invention is not necessarily intended to be limited in this regard. The first mirror 120 comprises a mounting member 160 coupled to an upper arm 180 such that the reflective surface 200 thereof faces the rear of the assembly (when oriented for use). The second mirror 140 comprises a mounting member 220 coupled to a lower arm 240 such that the reflective surface 260 thereof faces the rear of the assembly (when oriented for use).

Each of the mounting members 160, 220 is coupled to a respective arm 180, 240 via an actuator 280, 280', the actuator being configured to enable selective adjustment of the respective mirror about a horizontal and/or vertical axis, to enable the driver to adjust their mirrors to their own precise preference.

In this case, however, each of the arms 180, 240 is mounted, on the surface opposite that on which the respective mirror is mounted, on its own respective transparent panel 300, 300', the two transparent panels together forming the structural element Each transparent panel may be formed of, for example, glass (such as that conventionally used for vehicle windscreens) or plastic (such as that conventionally used for vehicle headlights), although the present invention is not necessarily intended to be limited in this regard. Each panel 300, 300' may, once again, have a horizontal cross-section in consideration of the aerodynamic characteristics of the assembly, but this is not necessarily essential. The arms 180, 240 may be mounted on a respective panel 300, 300' by means of a respective layer of glue 320, 320'.

The two transparent panels 300, 300' are coupled together by at least one guide member 310 (see FIG. 2B). The or each guide member 310 may be slidably mounted at one end in one of the panels and fixedly received in or on the other panel, such that one of the panels is vertically slidably adjustable relative to the other. Alternatively, the or each guide member 310 may be slidably mounted at both ends to respective panels, such that both panels can be slidably vertically adjusted relative to the other. Thus, the vertical spacing between the two panels 300, 300' can be selectively adjusted between a first position, in which the mirrors 120, 140 are closely adjacent or abutting each other (as illustrated in FIG. 2A), and a second position, in which they are vertically spaced apart. This may be particularly advantageous for different driving conditions. Thus, when the vehicle is travelling above a predetermined threshold speed, the mirrors may advantageously be in the first position, thereby optimising the aerodynamic characteristics of the mirror assembly; whereas, when the vehicle slows down to a threshold speed, or below, to negotiate, for example, a roundabout, the mirrors may advantageously be in the 10 second position, with the vertical space therebetween through which the driver can still see in the forward direction. A control module may be provided to monitor the speed of the vehicle and move the mirrors to the first position when the vehicle speed is above a predetermined threshold, and move the mirrors to the second position when the speed of the vehicle is equal to or below the predetermined threshold.

It is to be understood that the present invention is not limited to the embodiments described above and illustrated in the drawings; rather, the skilled person will recognize that many changes and modifications may be made within the scope of the appended claims.

The invention claimed is:

1. A side view mirror assembly comprising a first mirror and a second mirror, a lower arm and an upper arm for mounting said assembly to a vehicle, wherein said lower and upper arms are linked by a structural element, characterized in that said first and second mirrors are coupled to respective lower and upper arms and in that said structural element integrates the first and second mirrors and is transparent.

2. A side view mirror assembly according to claim 1, characterized in that each said mirror comprises a reflective surface on one side and a mounting member on the opposing side, said mounting member being directly mounted to a respective arm.

3. A side view mirror assembly according to claim 1, characterized in that each said mounting member comprises an actuator configured to permit, in use, an orientation of a respective mirror to be selectively pivotally altered about a vertical and/or horizontal axis.

4. A side view mirror assembly according to claim 1, characterized in that said structural element comprises a transparent panel extending between the lower and upper arm, such that said first and second mirrors are vertically aligned and spaced apart from each other, when the assembly is oriented for use.

5. A side view mirror assembly according to claim 4, characterized in that said lower and upper arms are mounted on said structural element such that one or both of said mirrors are vertically slidable relative to the other so as to permit, in use, a vertical spacing between said mirrors to be selectively altered.

6. A side view mirror assembly according to claim 4, characterized in that said structural element forms a common housing for said first and second mirrors.

7. A side view mirror assembly according to claim 1, characterized in that said structural element comprises two transparent panels, each transparent panel having a respective arm mounted thereto, wherein said transparent panels are vertically coupled so as to integrate said first and second mirrors.

8. A side view mirror assembly according to claim 7, characterized in that said transparent panels are slidably coupled by means of one or more guide members that permit, in use, a vertical spacing between said transparent panels and said mirrors to be selectively altered.

9. A side view mirror assembly according to claim 1, characterized in that said structural element is curved at least at its side edges toward said mirrors.

10. A side view mirror assembly according to claim 1, characterized in that said lower and upper arms are glued to said structural element.

11. A side view mirror assembly according to claim 1, characterized in that said structural element defines the front housing of the mirror assembly.

12. A side view mirror assembly according to claim 1, characterized in that said structural element comprises adjustment means configured to enable a vertical spacing between said first and second mirrors to be selectively altered between a first position, in which said mirrors are vertically immediately adjacent or abutting each other, and a second position, in which said first and second mirrors are vertically spaced apart from each other.

13. A side view mirror assembly according to claim 12, characterized by further comprising a control module configured to move said mirrors to said first position when a vehicle speed is above a predetermined threshold and to move said mirrors to said second position when a vehicle speed is equal to or below said predetermined threshold.

14. A side view mirror assembly according to claim 1, characterized in that said lower and upper arms are substantially opaque.

* * * * *